Figure 1:
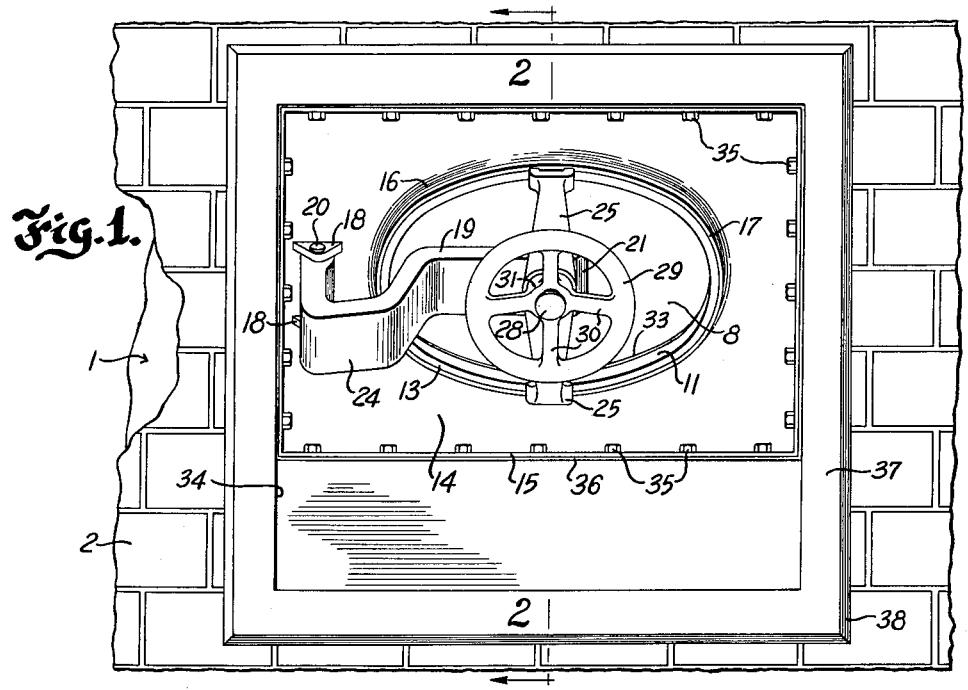

May 7, 1963     E. F. SCHMITZ     3,088,625
CLOSURE FOR METAL TANKS
Filed Aug. 6, 1959

INVENTOR.
EWALD F. SCHMITZ
BY
Andrus + Starke
Attorneys

United States Patent Office 3,088,625
Patented May 7, 1963

3,088,625
CLOSURE FOR METAL TANKS
Ewald F. Schmitz, Milwaukee, Wis., assignor to A. O. Smith Corporation, Milwaukee, Wis., a corporation of New York
Filed Aug. 6, 1959, Ser. No. 832,089
3 Claims. (Cl. 220—64)

This invention relates to a closure assembly for a metallic tank and is particularly directed to a manway assembly for a glass lined tank supported behind an enclosure wall and having aligned openings in the wall and the tank.

Beer tanks and the like which are employed for storage in stock cellars and the like require periodic cleaning. The tanks are provided normally with an entrance opening adjacent one end of the tank which is releasably closed by a suitable cover to allow entrance to the tank for cleaning and maintenance. Beer storage tanks are quite large often having a longitudinal dimension of the order of 40 feet and are conventionally supported behind a suitable wall having an opening aligned with the tank opening. A manway is preferably secured to the wall opening and the tank opening to seal the tank opening from the adjacent storage area and to allow direct entrance from the passageway into the tank.

The storage room is air conditioned to reduce the temperature and to maintain the room air dry. The manway maintains the storage room separated from the working aisle and allows washing of the tank with a hose and the like without introducing dirt and water into the conditioned storage room.

Corrosion of the tank and contamination of the stored beer can be prevented by providing a glass lining on the interior surface of the tank. The cover must then be secured to the opening with a non-corrosive joint to maintain a completely corrosion resistant inner surface presented to the stored beer.

In the formation of glass-lined beer tanks, the glass lining is preferably applied before attaching the mounting means for the cover and the manway chute assembly to the tank which would interfere with even heating of tank and consequently with establishment of a uniform glass lining. However, it is then extremely difficult to attach the mounting means by a weld or the like because the heat necessary to establish a satisfactory weld would rapidly destroy the glass lining.

In accordance with the present invention, a manway chute assembly is provided which allows glass lining of the tank and subsequent attachment of the cover and the manway chute. The construction provides a rugged and durable cover and manway chute attachment without disrupting the glass coating in any manner.

Generally, in accordance with the present invention a manway rim of corrosion resistant material is welded to the inner surface or periphery of the tank opening and extends perpendicularly to the tank opening. The tank with the rim is then glass lined in the conventional manner to establish a completely corrosive resistant interior surface. A mounting frame includes a metallic flange which is adapted to slip over the outer extremity or projection of the manway rim with generally contiguous outer edges. The adjacent or contiguous edges of the flange and of the projected manway rim way be readily welded without damaging the glass coating. The manway chute is readily bolted or otherwise attached to the mounting frame.

In accordance with another aspect of the invention, the cover for the opening is hinged to the mounting frame and is adapted to swing inwardly into the tank to provide ready access to the tank. To close the opening, the hinge is swung outwardly to dispose the cover into bearing engagement with the inner peripheral end of the manway rim. Suitable actuating means are provided to establish a pull on the cover and force it into sealing engagement with the inner peripheral edge of the manway rim.

Thus, the present invention provides a positive closure which may be readily attached to a glass lined tank and is particularly satisfactory for also attaching a manway chute between the tank opening and a wall opening behind which the tank is housed.

The drawing furnished herewith illustrates the best mode presently contemplated for carrying out the invention.

Figure 2:
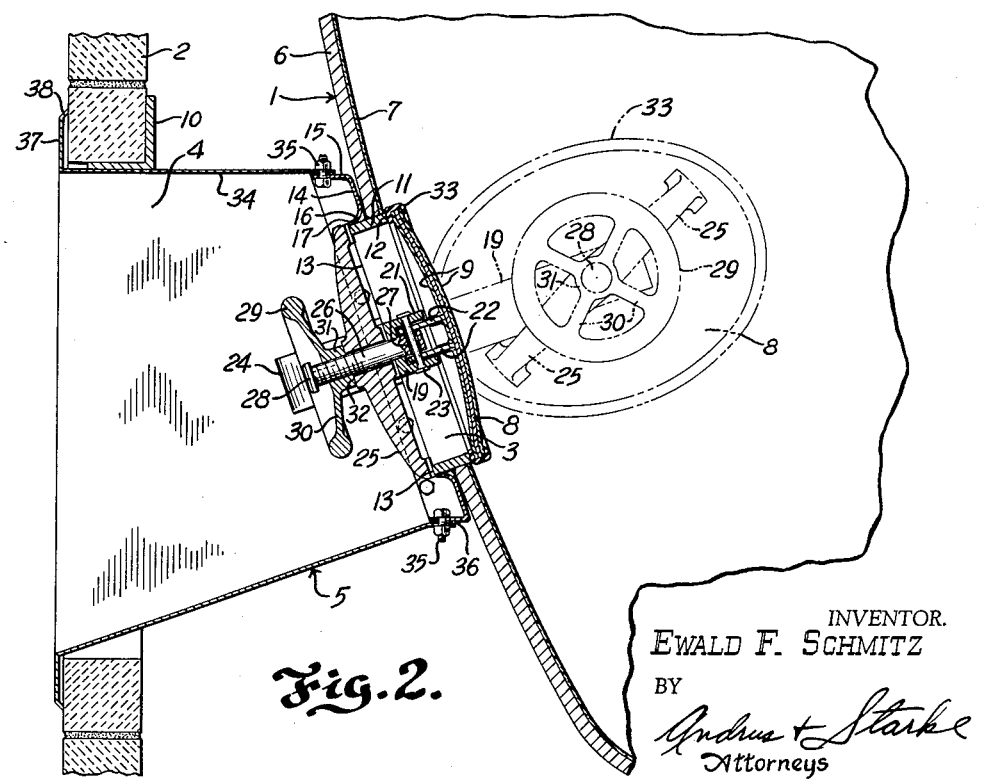

In the drawing:

FIG. 1 is front elevational view of a fragmentary portion of a tank and wall interconnected by a manway chute assembly constructed in accordance with the present invention; and FIG. 2 is a sectional view taken on line 2—2 of FIG. 1 with the closure for the tank opening shown in phantom in the open position.

Referring to the drawing, glass lined tank 1, of which only a small fragmentary portion of a dish-shaped end wall is shown, is mounted behind a suitable tile wall 2 defining an enclosure for the tank 1. A tank opening 3 is aligned with a wall opening 4 to allow entrance to the tank for cleaning and the like. A manway chute assembly 5 is secured adjacent the periphery of the openings 3 and 4 to seal the opening 3 from the area within which the tank is mounted for sanitary purposes.

The glass lined tank is a conventional construction including an outer metal shell 6 having a glass lining 7 covering the entire inner surface of the tank. The tank is adapted to be supported in a stock cellar or the like for storing the beer for periods of time. The opening 3 is generally an oval-shaped opening which is releasably sealed by an inner cover 8. A glass coating 9 is applied to the surfaces of the cover 8 to maintain a substantially continuous glass surface presented to the beer or the like, not shown, which is stored within the tank 1.

The tile wall 2 defining the area within which the tank is supported is shown as being built up of conventional refractory glazed tile which are cemented in laterally staggered and stacked relation. An angle brace 10 spans the upper edge of the opening 4 and is inserted between the adjacent side tiles to support the wall above the opening 4.

The opening 4 is generally rectangularly shaped and is substantially larger than the oval shaped opening 3 to the tank to allow ready access or movement from the outside of the wall 2 through the manway chute assembly 5 into the tank 1.

The manway chute assembly 5 supports the cover 8 and seals the openings 3 and 4 together to tightly close the opening 3 from the adjacent storage area and to allow access to the cover 8. Consequently, the beer tank 1 may be entered for cleaning periodically.

Referring particularly to FIG. 2, the manway chute assembly 5 includes an annular oval shaped manway rim 11 which is welded circumjacent the edge of the tank opening 3 by continuous encircling welds adjacent the inner and outer edges of the tank opening to hermetically seal the rim to the opening. The rim 11 projects normal to the adjacent tank surface to establish an inner sealing edge 12 against which the cover 8 is tightly clamped and an outer clamp and attachment edge 13 to which a chute mounting frame 14 is secured.

The manway rim 11 is welded in place and the glass lining 7 is then applied to the tank prior to attachment of the cover 8 and the chute mounting frame 14. The glass lining covers the interior surface of the tank 1 into embutting engagement with the adjacent internal projection of the rim 11.

The annular manway rim 11 is formed of a corrosion resistant material such that when the cover 8 is closed, a continuous corrosion resistance surface is presented to the beer stored within the tank. The rim 11 is also preferably formed of a material having a coefficient of expansion substantially corresponding to that of the glass lining. Applicant has found that Inconel is a highly satisfactory material for the rim 11.

After glass lining 7 is applied, the mounting frame 14 is secured to the outer projection of rim 11.

The metallic chute mounting frame 14 includes an outer rectangular wall 15 and an inner annular wall 16 defining a channel-shaped cross section.

The inner annular wall 16 is generally oval shaped and defines a central oval-shaped opening corresponding generally to the outer peripheral circumference of the manway rim 11. The mounting frame is consequently adapted to be slipped over the manway rim 11. The depth of the annular wall 16 generally corresponds to the depth of the outward projection of the manway rim 11 such that with the mounting frame 14 assembled in touching engagement with the adjacent surface of the tank 1, the annular wall 16 terminates just within the outer edge 13 of the manway rim 11. A continuous weld 17 hermetically seals the contiguous edges of the annular wall 16 and the edge 13 of the annular rim 11.

The outer edge 13 of the rim 11 is preferably also ground and polished subsequent to the welding operation to maintain a smooth, sanitary clamping surface.

The cover 8 is pivotally secured to the mounting frame 14 for selective positioning in an open and closed position as follows.

A pair of spaced hinge lugs 18 are welded to the base portion of frame 14 between the outer wall 15 and the inner annular wall 16. The hinge lugs 18 are generally secured in alignment with the principal axis of the oval-shaped opening defined by the manway rim 11. A hinge arm 19 is pivotally secured to the lugs 18 by a pin 20 and extends laterally therefrom terminating generally in alignment with the center of the manway opening. The hinge arm 19 is generally a channel-shaped member opening toward the tank and terminates in a closed end 21 which is pivotally secured to the center of the oval-shaped cover 8.

The cover 8 includes a pair of outwardly projecting lugs 22 spaced to project inwardly of the channel-shaped hinge end 21. A pin 23 is secured within aligned openings in the side walls of the closed hinge arm end 21 and the lugs 22 to pivotally connect the hinge arm 19 to the cover 8.

The hinge arm 19 includes a hook portion 24 immediately adjacent the frame lugs 18 which opens towards the tank 1 and extends over the adjacent rim edge 13. The outer portion of the hook portion 24 is spaced from the tank 1 by sufficient distance to allow pivoting movement of the hinge arm 19 into the tank 1.

The cover 8 is releasably clamped in sealing engagement with the adjacent inner sealing edge 12 of the manway rim 11 as follows.

A yoke 25 is operatively secured by a threaded screw 26 to the cover 8 and hinge arm 19. The threaded screw 26 is apertured at its inner end and journaled on pin 23. The screw 26 extends outwardly through a suitable opening 27 in the arm 19 and yoke 25 to rotatably support the yoke and allow pulling on the cover 8. The outer end of the screw 26 is threaded as at 28 to receive an actuating handwheel 29 for movement inwardly and outwardly with respect to the cover 8. The actuating handwheel 29 includes a series of spokes 30 integrally formed with a central bearing hub portion 31 which is threaded on the outer end of screw 26. The yoke 25 is rotatably carried by screw 26 with cooperating bearing surfaces 32 on the adjacent portions of the yoke 25 and the hub portion 31.

The bearing yoke 25 terminates in U-shaped bearing ends which are adapted to engage the rim edge 13. The length of the yoke 25 corresponds to the minor diameter of the oval-shaped rim 11. Thus, when the yoke 25 is positioned in alignment with the minor axis of the rim 11 and the handwheel 29 threaded onto the screw 26, the yoke 25 is moved inwardly into bearing engagement with the adjacent rim edge 13. Further movement of the handwheel 29 causes the screw 26 and the attached cover 8 to move outwardly and the cover 8 is tightly and firmly seated on the inner rim edge 12 with a sealing gasket 33 interposed between the cover 8 and rim edge 12.

To remove the cover 8 from the opening 3, the handwheel 29 is released or withdrawn to allow disengagement of the yoke 25 from the adjacent rim edge 13. The yoke 25 is then pivoted into general alignment with the major axis of the rim or opening 3. The hinge arm 19 may then move freely through the tank opening 3 to open the opening and allow access to the tank 1 through the aligned wall opening 4 and the tank opening 3.

A manway chute 34 seals the wall opening 4 to the tank opening 3 to seal the opening 3 from the adjacent storage area or room.

The manway chute 34 is a generally tubular metallic member having one end generally corresponding in configuration to the wall opening 4 and the opposite end corresponding generally to the configuration of the outer wall 15 of the mounting frame 14. In the illustrated embodiment of the invention, the openings 4 and 3 are so related that the upper portion of wall 15 of the mounting frame 14 is on a level with the upper opening or edge of the wall opening 4. Consequently, the upper portion of the chute 34 is adapted to extend horizontally inwardly and the lower portion of the chute 34 tapers upwardly from the wall opening 4 to the wall 15 of the adjacent mounting frame 14. The inner end of the tapered portion of chute 34 is bent to extend horizontally in vertical alignment with the wall 15 of the mounting frame 14.

The overlying portions of the mounting frame 15 and the immediate end of the manway chute 34 are provided with a plurality of aligned bolt openings and a plurality of bolt and nut assemblies 35 extend therethrough to fixedly interconnect the manway chute 34 to the mounting frame 14. A gasket 36 of rubber or other suitable material is disposed between the adjacent surfaces of the wall 15 and the chute 34 to establish an airtight joint.

A radial flange 37 is integrally formed on the outer end of the chute 34 and extends outwardly parallel to the outer surface of the tile wall 2. The outermost edge of flange 37 is bent rearwardly into engagement with the adjacent wall 2 to seal the wall opening 4 from the storage area.

The operation of the illustrated embodiment of the invention is summarized as follows:

The tank 1 is formed and the rim 11 is welded to the tank opening 3. The glass lining 7 is then fused to the inner surface of the tank shell 6 with the lining abutting the inward rim projection. The mounting frame 14 is assembled about the rim 11 and welded to the outward projection of rim 11 by the encircling weld 17.

The cover 8 is secured to the mounting frame as previously described to releasably close the opening 3. The tank is mounted in position within the storage unit behind the tile wall 2 and the manway chute 34 is sealed to the wall 15 of the chute mounting frame 14 and to the outer surface of the tile wall 2 to seal the openings 3 and 4 from the adjacent storage area. The opening 3 is readily opened and closed by actuation of the handwheel 29 to permit entrance of personnel for cleaning and maintenance.

The frame 14 may be bolted directly to the rim 11 or the chute 34 may be formed with an integral attachment means for securement to the rim 11.

Rim 11 may be water cooled during the welding of the mounting frame 14 to rim 11 to positively prevent damage to the glass lining.

The cover and manway support assembly of the present invention provides a ready and inexpensive means for attaching an enclosure and/or manway to a glass lined tank.

Various modes of carrying out the invention are contemplated as being within the scope of the following claims particularly pointing out and distinctly claiming the subject matter which is regarded as the invention.

I claim:

1. A manway chute assembly establishing access to a glass-lined tank mounted behind a wall, said tank having an opening generally aligned with a larger opening in the wall, a corrosion resistant rim corresponding to said tank opening and having generally the same coefficiency of expansion as the glass lining of the tank, a continuous weld securing said rim to the periphery of the tank opening with the rim projecting inwardly to form a cover engaging edge and outwardly to form a clamping edge, a metal mounting frame disposed peripherally of said rim on the outside of the tank and having an outwardly facing channel shaped cross-section providing an inner flange-like wall encircling the outward projection of the rim and extending outwardly in the direction of said rim with its outer edge adjacent to and coextensive with the outer edge of said rim, a continuous weld securing the contiguous outer edges of the rim and of the inner wall of the mounting frame, a manway chute generally bridging the space between the tank and wall peripheral of said openings therein and having an inner end circumjacent the outer flange-like wall of the channel shaped mounting frame and an outer end circumjacent the wall opening, a flange on the outer end extending over the adjacent wall to close the wall opening, bolt means releasably securing the inner end of the manway chute to the mounting frame, a gasket interposed between the inner end of the manway and the mounting frame to seal the tank opening from the adjacent storage area, an interior cover for said tank opening adapted to engage the cover engaging edge of the rim to seal the opening, and a hinge secured to the frame between the outer and inner walls thereof and to the cover, and a clamp means secured to the cover and engageable with the outer edge of said rim to support the cover.

2. In combination, a glass-lined metal tank having an outwardly extending flange rim peripheral of an opening therein and integral with the tank wall, a mounting frame disposed adjacent the tank wall and having an opening therein corresponding to the opening in the tank wall and coinciding therewith, said mounting frame being of outwardly facing channel shape with an outwardly extending flange lip thereon defining the opening therein and receiving said flange rim in telescoped relation with the edges of said flange rim and said flange lip closely adjacent and coextensive, and a weld joining the edges of said flange lip and flange rim to secure said mounting frame to the tank wall, said weld being substantially spaced from the glass lining of the tank.

3. The construction of claim 2, and a manway chute removably secured to the outer portion of said mounting frame and surrounding the approach to said tank opening.

References Cited in the file of this patent

UNITED STATES PATENTS

| | | |
|---|---|---|
| 1,929,761 | Thwaits | Dec. 10, 1933 |
| 2,162,446 | Scott | June 13, 1939 |
| 2,271,411 | Thwaits | Jan. 27, 1942 |
| 2,274,475 | Focke et al. | Feb. 24, 1942 |
| 2,869,749 | Arne | Jan. 20, 1959 |

FOREIGN PATENTS

| | | |
|---|---|---|
| 598,621 | Great Britain | Feb. 23, 1948 |
| 708,360 | Great Britain | May 5, 1951 |